Aug. 7, 1951  C. C. FUERST  2,563,782
SETTING TYPE SHUTTER WITH POWER-OPERATED RELEASE
MEANS AND FLASH SYNCHRONIZING SWITCH
Filed March 26, 1947  2 Sheets-Sheet 1

CARL C. FUERST
INVENTOR

BY
ATTORNEYS

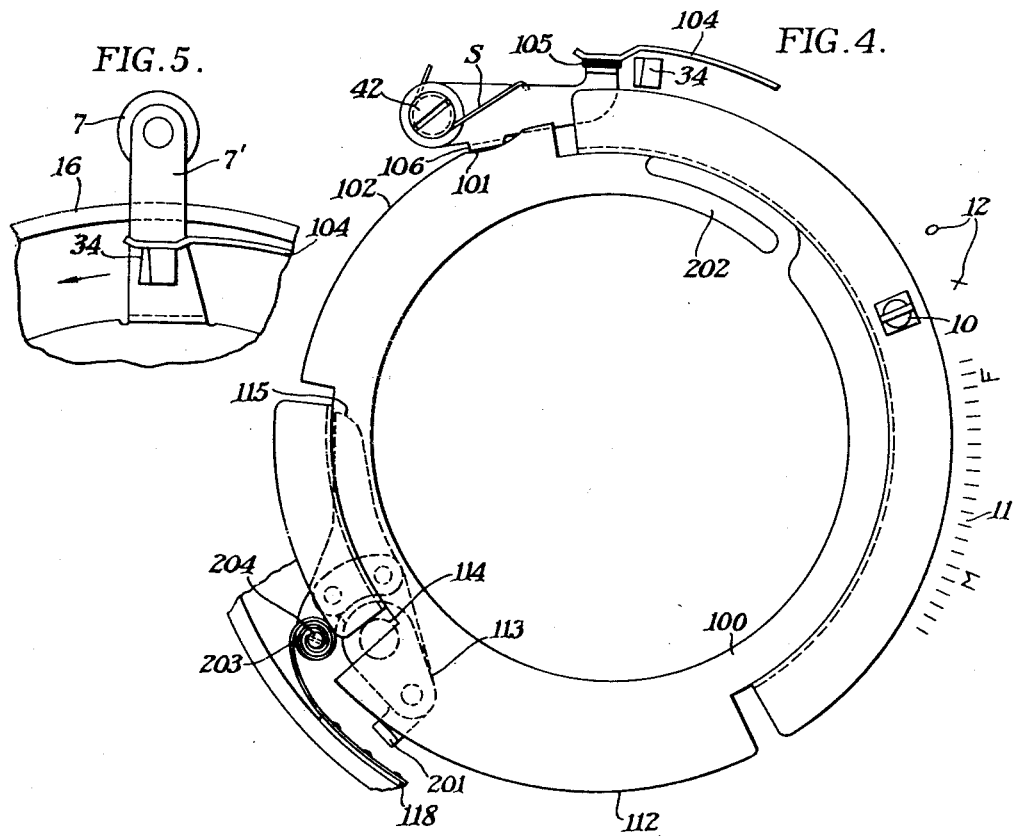
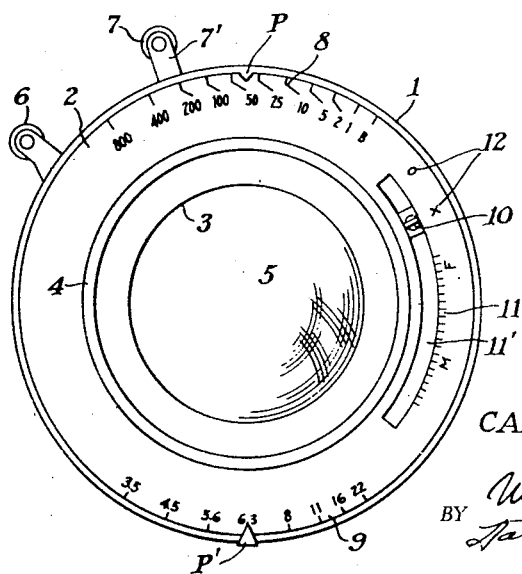

Patented Aug. 7, 1951

2,563,782

UNITED STATES PATENT OFFICE 2,563,782

SETTING TYPE SHUTTER WITH POWER-OPERATED RELEASE MEANS AND FLASH SYNCHRONIZING SWITCH

Carl C. Fuerst, Rochester, N. Y., assignor to Eastman Kodak Company, Rochester, N. Y., a corporation of New Jersey Application March 26, 1947, Serial No. 737,351

11 Claims. (Cl. 95—11.5)

This invention relates to flash synchronizers, and particularly to a flash synchronizer built into a photographic shutter of the between-the-lens type.

The flash synchronizer of this invention is particularly designed for use with, and forming a part of, the new setting type photographic shutter shown in my copending U. S. applications Serial Numbers 728,528 and 772,123 filed February 14, 1947 and September 4, 1947, respectively. Application S. N. 728,528 has issued as United States Patent 2,524,786 while application S. N. 772,123 has become abandoned.

One object of the present invention is to provide a flash synchronizer which is built into a photographic shutter, and designed so that the shutter blade mechanism forms a part of the switch and switch operating mechanism.

Another object is to provide a built-in flash synchronizer which comprises two stitches, one for use with flash lamps having conventional "lags" and the other for use with gaseous discharge flash lamps, e. g. Kodatron, which have no "lag," and including adjusting means by which each of the switches may be selectively used independently of the other, or both switches can be rendered inoperative if the shutter is to be used for normal daylight photography.

And still another object is to provide a built-in flash synchronizer of the type set forth including means for preventing either of the switches from being prematurely closed during the setting operation of the shutter so that the shutter may be set with a good lamp in the socket of a flash holder connected to the shutter.

And still another object of the present invention is to provide a synchronizer of the type set forth which is so connected to and forms a part of the shutter blade operating mechanism that its operation in timed relation to the opening of the shutter is entirely independent of the speed at which the shutter trigger is actuated by the operator and the synchronization of the lamp flashing and shutter opening is constant and regulatable in according with the flashing characteristics of different flash lamps.

And yet another object is to provide a flash synchronizer of the type set forth which is relatively inexpensive and does not necessitate the shutter casing being enlarged for its incorporation because it makes use of a number of parts of the normal shutter blade operating mechanism and requires a minimum of additional parts.

Figure 1:
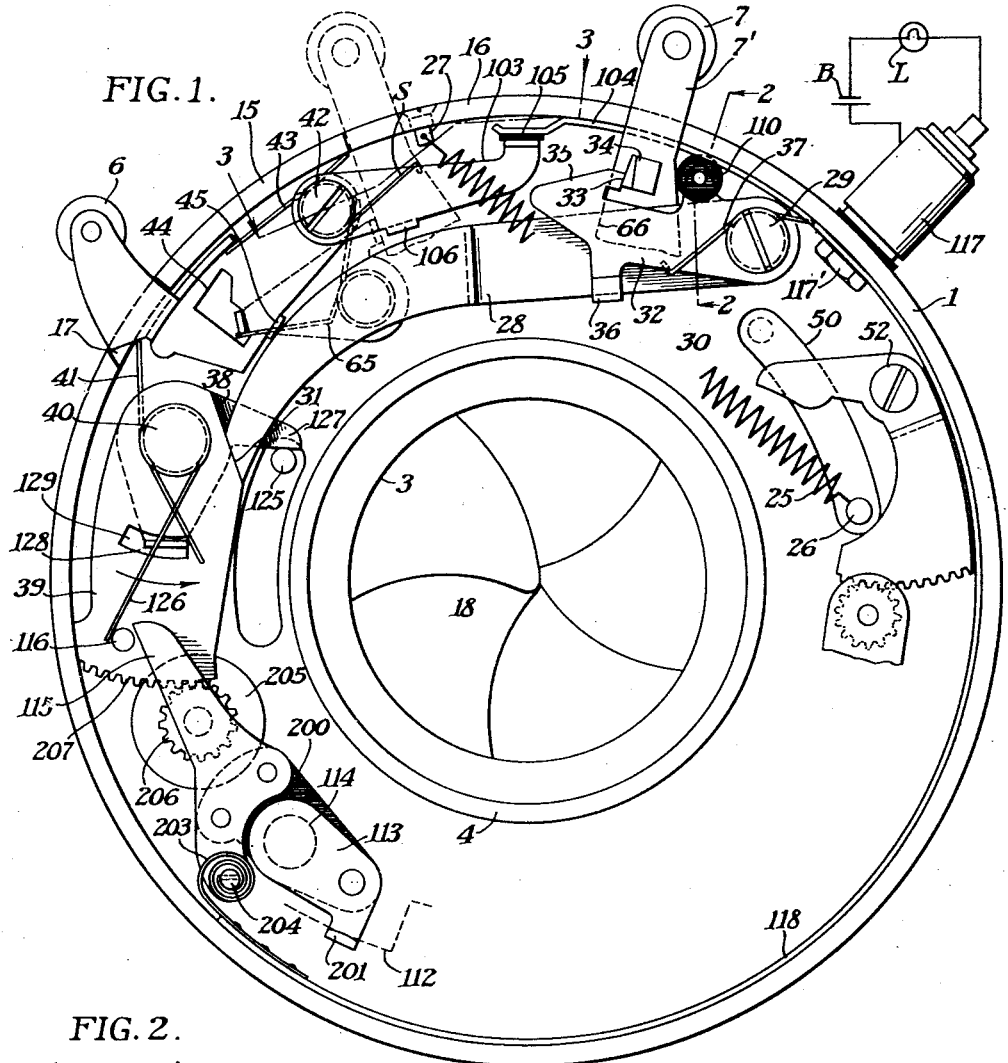
Figure 2:
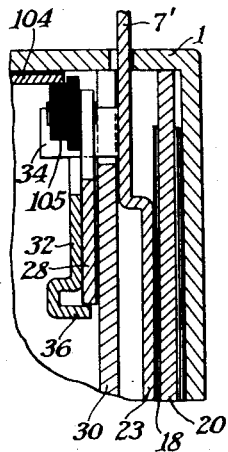
Figure 3:
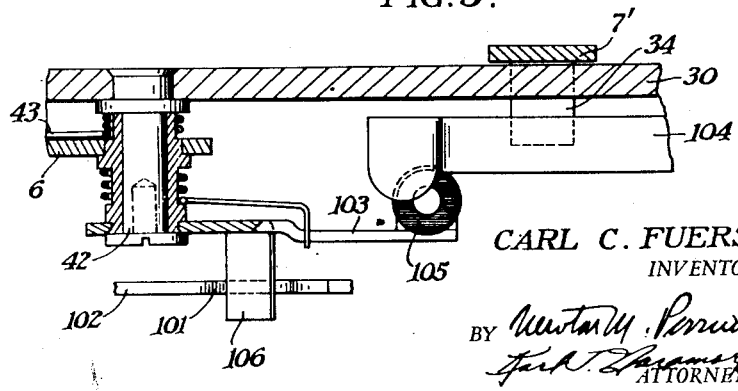

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which Fig. 1 is a fragmentary front elevation of a shutter with the shutter cover removed and showing a preferred embodiment of my invention. In this view the shutter is shown in its set condition and with the synchronizer adjusted so that the switch for synchronizing conventional flash lamps is operative, while the switch for use with gaseous discharge flash lamps is rendered inoperative, Fig. 2 is an enlarged fragmentary section taken substantially on line 2—2 of Fig. 1, Fig. 3 is an enlarged fragmentary section taken substantially on line 3—3 of Fig. 1, Fig. 4 is a plan view of the adjusting ring of the flash synchronizer and the two switches associated therewith, Fig. 5 is a fragmentary plan view of the shutter showing the blade ring in the position it assumes when the blades are fully open during the opening movement and showing how the protuberance thereon and constituting one switch contact engages a stationary contact for synchronizing lamps of the gaseous discharge type, and Fig. 6 is a front plan view of the shutter on a somewhat reduced scale from the preceding views and showing the shutter cover and the synchronizer adjusting mechanism.

Like reference characters refer to corresponding parts throughout the drawings.

The shutter of which my synchronizer forms a part may appear as shown in Fig. 6. As indicated, the shutter may consist of an annular casing 1 having a shutter cover plate 2 surrounding a central exposure aperture 3 and may contain the usual threaded flanges 4 into which a front lens element 5 may be screwed in the usual manner. The shutter is preferably provided with a trigger 6 for releasing the shutter and a setting lever 7 for tensioning the operating spring. The shutter cover may contain a speed scale 8 with its pointer P and a diaphragm scale 9 with its pointer P'. In accordance with the present invention it is also provided with a synchronizer adjusting means to make it possible for the operator to adjust the synchronizer for use with different conventional flash lamps having the characteristic "lag," and for use with gaseous discharge flash lamps having no "lag" and for rendering the synchronizer inoperative entirely.

As shown, this synchronizer adjusting means comprises a setting member 10, which is fastened to an adjusting cam in the shutter as will be described, and which extends upwardly through and moves in an arcuate slot 11' in the shutter cover. The shutter cover adjacent this slot is provided with a graduated scale 11 carrying letters M and F and indices X and O with which the setting member cooperates. When the setting member is set opposite the letter M on scale 11 the synchronizer is adjusted for use with a conventional flash known as the SM flash lamp and having approximately a 5 millisecond lag. When it is set opposite the letter F the synchronizer is adjusted for the use of conventional flash lamps having approximately a 20 millisecond lag, an example of which is the #5 flash lamp. When the setting member is set opposite the letter X the synchronizer is adjusted for use with gaseous discharge lamps having no lag, e. g. Kodatron, and when adjusted to the O position the synchronizer is rendered inoperative so the shutter can be used for normal daylight photography with a good flash lamp connected into the flash circuit.

Essentially, the present flash synchronizer comprises two switches which are associated with the shutter mechanism so as to be closed by operation of the mechanism in proper timed relation with the opening of the shutter so as to synchronize the peak of the flash of the lamp with the full open position of the shutter. One switch is designed for synchronizing flash lamps having a "lag" which necessitates the circuit being closed prior to or during the opening movement of the shutter blades, while the other switch is designed to be closed the instant the shutter blades reach their full open position. Inasmuch as the flash synchronizer switches are associated with, and their operation is dependent upon the operation of, the shutter operating mechanism the shutter mechanism per se will be described sufficiently to point out the features of the present invention. It is pointed out, however, that since this shutter is radically new in design and operation, and is fully described in my copending applications Serial Numbers 728,528 and 772,123 filed February 14, 1947, and September 4, 1947, respectively, only so much of the shutter mechanism per se will be disclosed herein as necessary to point out the operation of my present flash synchronizing device.

As indicated in Fig. 1, the annular shutter casing may include an upstanding flange 15 extending around the periphery of the shutter, this flange having a slot 16 formed in the flange to permit the movement of the setting lever 7 and having a slot 17 permitting movement of the trigger 6 for releasing the shutter mechanism. As clearly set forth in my above noted copending application the shutter blades 18 are of the symmetrical type, each blade being pivoted to the mechanism plate 20 and having an upstanding pin (not shown) entering a slot (not shown) in a movable blade ring 23. This blade ring directly carries an arm 7' which terminates in setting handle 7 and extends out through the slot 16 in the shutter flange 15. A power spring 25 is connected directly to the blade ring 23 by a pin 26 and is connected to a stud 27 carried by the shutter casing at its opposite end. Thus the spring 25 acts directly on the blade ring 23 and it becomes tensioned when the setting lever 7 is moved to the Fig. 1 position.

As indicated in the Fig. 1 position, the blade ring is held with the spring tensioned by means of a latch mechanism which consists of a first latch member 28 pivoted on the stud 29 attached to the lower mechanism plate 20. The latch 28 has a beveled end 31 and extends across the top of the shutter, this latch member lying beneath a second latch member 32 also pivoted on the stud 29. Latch 32 has a latch face 33 adapted to engage an outwardly-projecting protuberance 34 on the setting lever 7', and which protuberance constitutes a contact of one synchronizing switch as will be hereinafter described. This latch therefore holds the setting lever in its set position when the lug 34 moves up over the incline 35 of the second latch member as the handle 7 is moved to a set position. A downwardly-extending flange 36 limits the upward movement of the second latch member 32 under the impulse of its spring 37, but it also permits the second latch to move downwardly with respect to its Fig. 1 position and the first latch member 28.

The first latch 28 includes the beveled surface 31 above referred to, this beveled surface normally lying in contact with a beveled surface 38 on the shutter-releasing member 39. This member may turn upon a pivot 40 and includes a power spring 126 which by acting on pin 116 fixed to and extending above member 39 tends to turn member 39 in a counter-clockwise direction. When the beveled surfaces 31 and 38 engage, movement of the member 39 is prevented because the engagement of these surfaces is almost on dead centers between the studs 40 and 29 on which the power operated member 39 and the first latch member turn. However, the trigger 6 can start movement of the first latch member 28 which may then be completed by the power-operated member 39 in the following manner.

The trigger 6 is pivoted on a stud 42 and is normally held by a spring 43 in the position shown in Fig. 1. The trigger member has an inverted L-shaped slot 44 and a lug 45 which lies above the first latch member 28. When the trigger member 6 is depressed, this lug 45 engages and moves the lever 28 a distance insufficient to move the latch element 33 on the second latch member 32 from the protuberance 34 on the arm 7' of the blade ring. Thus, the trigger alone does not release the shutter, but merely starts movement of the first latch member 28 which movement is continued by the power operated member 39. This feature is important to the operation of the synchronizing mechanism to be described and should be kept in mind. As soon as the beveled surfaces 31 and 38 move some distance off center, the power operated member 39 can then take over movement of the latch 28 moving the second mentioned latch 32 downwardly until the face 33 slips off of the protuberance 34. As soon as this occurs, the spring 25 moves the blade ring 23 rapidly in a counter-clockwise direction, causing the blades to open and close the exposure aperture 3.

The power-operated member 39 is free to turn on its stud 40. This stud also pivotally supports bell crank 127, having on the other arm thereof a lug 128 extending upwardly into the slot 129 in power-operated member 39. Bell crank arm 127 lies in the path of pin 125 on the blade ring 23 and is moved by it when the blade ring is set by handle 7. As pointed out above, the power-operated member 39 is connected to the bell crank by a powerful spring 126 encircling stud 40 and engaging pin 116. This spring tends to move member 39 in the direction of the arrow, Fig. 1, but in this view, latch 28 with surface 31 engaging the beveled surface 38 prevents such movement. It might be pointed out that the end of spring 126, engaging pin 116, is above the plane of movement of lug 128 so as not to interfere with the movement of said lug.

There is a light spring 41 encircling stud 40 having one edge resting on the casing and the other lying directly beneath the arm of spring 126 lying against lug 128 and engaging the same side of lug 128 as does spring 126. This spring tends to turn members 39 and the bell crank in a clockwise direction when lug 128 contacts the left hand end of the slot, looking at Fig. 1. Thus the function is that with bell crank arm 127 held set as in Fig. 1, spring 126 exerts a torque on pin 116 which will overcome spring 41 as soon as latch 28 has been moved a sufficient distance by the trigger for the power-operated member 39 to take over, at which time spring 126 will drive member 39 counter-clockwise and latch element 33 will release protuberance 34.

The blade ring 23 will then move in making an exposure and arm 127 will be released, moving lug 128 to the left hand end of slot 129. When this position is reached, spring 41 can readily swing both the bell crank lever and member 39 clockwise, because the tension in spring 126 has been reduced due to the counter-clockwise movement of member 39, but arm 127 will still be across the path of pin 125 and the latch elements 31 and 38 become engaged. Therefore, when handle 7 is moved to set the shutter, pin 125 again moves bell crank to its Fig. 1 position, in which the lug 128 thereon is in the right hand end of slot 129, and simultaneously tensioning the spring 126 so that this spring is again set to drive release member 39 in a counter-clockwise direction.

By virtue of the use of shutter blades of the symmetrical type the shutter opens and closes when the blade ring moves in a counter-clockwise direction by an amount shown between the full and dotted line positions of the setting lever 7 in Fig. 1, or by movement which moves pin 125 on the blade ring from one end of the slot in the upper mechanism plate 20 to the other end of the slot, see Fig. 1. For the same reason the blades must both open and close during the seting operation of the shutter. Accordingly, it is necessary to prevent light from entering during this movement. This is accomplished in the present shutter by a cover blind arrangement associated with the trigger which covers the exposure aperture during the time the shutter is being set and opens the same just prior to release of the blades from the cocked position. This cover blind arrangement is fully disclosed in my above noted copending applications, and since it forms no part of the present invention a further description thereof in this specification is not deemed necessary. The only reason it was mentioned at all herein was to point out that the shutter mechanism opens and closes by a movement of the blade ring in one direction only, a feature that is important to the consideration of the flash synchronizer, particularly since it differs from most conventional shutters where the blade ring oscillates in two directions when making an exposure.

Now that sufficient of the shutter mechanism has been disclosed to point out how it operates to open and close the exposure aperture when released, the flash synchronizer constituting the present invention will be described. Fastened to the flange 15 of the shutter casing is a terminal 117 to which a mating connector on a flash holder, not shown, may be connected. The flash holder will include a source of potential and a flash lamp, B and L, respectively, shown diagrammatically in Fig. 1, and the terminal 117 is such that one side of the flash circuit will be grounded to the shutter casing through the shell of the terminal, while the other side of the circuit will be connected to the center post 117' of the terminal which is insulated from the shutter casing and extends to the interior thereof.

The switch for synchronizing conventional flash lamps having a "lag" comprises the pin 116 carried by the shutter-releasing member 39 and an adjustable contact 115 lying in the path of the pin 116. The contact 115 is pinned to an insulating member 200 which is carried by an arm 113 pivoted on a stud 114 fastened to the mechanism plate 30. The arm 113 has an upturned lug 201 thereon which engages a cam surface 112 on the synchronizer adjusting ring 100 which is oscillatably mounted in the shutter casing below the cover plate and has the adjusting member 10 fastened thereto, see Fig. 4. The adjusting ring 100 has a resilient finger 202 struck up therefrom to engage a stationary part of the shutter casing and provide a suitable amount of friction to hold the ring in an adjusted position. That portion of the ring having the adjusting member 10 is formed upwardly from the plane of the ring so that the adjusting member 10 will extend through the arcuate slot 11' in the shutter cover to be accessible for manual adjustment, see Fig. 6. Contact 115 is electrically connected to the center post 117' of the terminal 117 by an insulated conductor 118 lying adjacent the interior of the flange 15 of the shutter casing and a conductor strip 203 fixed at one end to the conductor 118 and at the other end to a pin 204 on the arm 115. The conductor strip 203 is made of a resilient metal and is made in the form of a coil spring so that it normally tends to pivot contact 115 counter-clockwise and hold the lug 201 against the cam surface 112.

Thus, since contact 115 is connected to one side of the flash circuit through the center post 117' of terminal 117 and pin 116 is connected to the other side of the circuit which is grounded to the shutter casing, when pin 116 engages contact 115 the flash lamp circuit will be closed to flash the lamp. Inasmuch as pin 116 is carried by the shutter-releasing member 39, it can be made to engage contact 115 at any desired time prior to the actual release of the shutter by member 39 and in accordance with the lag characteristic of the flash lamp being used. To obtain the desired delay between the closing of the lamp circuit and the release of the shutter there is provided a gear retard mechanism comprising a fly wheel 205 having a pinion 206 fixed thereto which is engaged by a gear segment 207 on the arcuate end of the member 39. By adjusting the synchronizer adjusting ring 100 through the use of member 10 and the scale 11 the position of contact 115 relative to that of pin 116 on member 39 can be varied to obtain a synchronization of the peak of illumination of the flash lamp with a full opening of the shutter in accordance with the "lag" characteristics of the flash lamp being used.

By virtue of the pin and slot and spring connection between power member 39 and bell crank 127, set forth above, the member 39 is moved to its normal position, shown in Fig. 1, after having moved to a shutter releasing position and in which position contact or pin 116 is moved away from contact arm 115 to open the synchronizer switch. Inasmuch as this switch, therefore, remains open during the setting operation of the shutter a new flash lamp may be placed in the circuit prior to the shutter being set without danger of the same being prematurely flashed during the setting operation of the shutter. Another advantage derived from this construction is that the synchronizer switch is closed by the power driven member 39 entirely independent of manual control of the operator. Consequently, since the speed of operation of the power driven member 39 is constant, and entirely independent of manual manipulation, it is possible to readily and accurately adjust the synchronization of the closing of the flash switch and the opening of the shutter by means of a member such as adjusting ring 100. In addition, since the synchronizer switch is an integral part of the shutter mechanism it is automatically set at the same time as the shutter, and thus two separate operations need not be remembered by the operator. Although the synchronizer switch is built into and forms a part of the shutter mechanism in such a way that it can not be disconnected therefrom for normal daylight exposures, the structure of the switch is such that it in no way hampers the normal operation of the shutter so that its continued presence is not undesirable.

In order to provide for the synchronization of flash lamps of the gaseous discharge type, e. g. Kodatron, which have no characteristic lag in firing, but fire immediately upon closure of the circuit, the shutter is provided with a second synchronizing switch comprising a stationary resilient spring contact 104 and the protuberance 34 on the setting lever 7'. The stationary spring contact 104 is directly connected to the center post 117' of the terminal 117 while the protuberance 34 is connected to the other side of the flash circuit by virtue of its being grounded to the shutter casing. The spring contact 104 has a turned down end which is normally spring pressed into the path of the protuberance 34 to be wiped thereby as the setting lever 7' of the blade ring 23 moves counterclockwise upon release of the shutter, see Fig. 5. The contact 104 is so disposed in the path of movement of the protuberance 34 that they will come into engagement at the instant the shutter blades are full open.

To prevent this switch from being closed when the shutter is set, an insulated knob 110, carried by latch member 32, engages and moves contact 104 to an inoperative position out of the path of protuberance or contact 34. Upon release of the shutter the latch member 32 moves counterclockwise to release protuberance 34, which also serves as a latch member, and knob 110 is moved away from contact 104 to allow it to move into the path of the protuberance 34 and be engaged thereby.

In order to completely cut out this second switch when the first one is being used or when the shutter is being used for normal daylight photography with a lamp in circuit, a lever 103 is pivoted on the stud 42 and has an insulated pad 105 for engaging the end of contact 104. This lever 103 includes a turned-down lug 106 which is adapted to engage a cam surface 102 on the synchronizer adjusting ring 100 and is normally spring pressed into engagement with the cam surface by a spring S wrapped around stud 42, see Figs. 1 and 3. The major portion of the cam surface 102 is such as to normally force lever 103 counter-clockwise to raise spring contact 104 out of the path of protuberance 34, and in which position this second switch is inoperative.

However, the cam surface 102 includes a recess 101 for receiving the lug 106 of lever 103 and to allow the lever 103 to drop down sufficiently to permit contact 104 to move into the path of protuberance 34 when freed by insulating knob 110. This condition of parts is effected by oscillation of adjusting ring 100 to the position where adjusting member 10 connected thereto is opposite X on the indicating scale on the shutter cover. In this position of the adjusting ring 100, a high point on the cam surface 112 has adjusted contact 115 of the first switch clockwise until it is completely out of the range of movement of pin 116 and the first switch is therefore rendered inoperative.

When conventional flash lamps having a characteristic lag are to be used, the adjusting member 10 is moved to the proper point on adjusting scale 11. This causes the adjusting ring 100 to be adjusted to a position in which the first switch is operative and in which the cam surface 102 raises lever 103 which in turn holds contact 104 out of the path of movement of protuberance 34, and in which position the second switch is rendered inoperative.

Should it be desired to cut out both synchronizer switches, as would be the case if the shutter is to be used for normal daylight photography with a flash lamp connected in circuit with the switches, the adjusting member 10 is moved to the position marked "O" on the shutter cover. In this position both switches are rendered inoperative because a high point on cam surface 112 moves the contact 115 out of the range of movement of pin 116 while cam surface 102 moves lever 103 to a position in which it holds contact 104 out of the path of protuberance 34.

From the above description it will be seen that I have provided a built-in flash synchronizer which is adapted for synchronizing all types of flash lamps by the use of two separate switches which can be selectively used and/or entirely disconnected for normal daylight use of the shutter with a flash holder connected thereto and with a good lamp in the circuit. The fact that the synchronizer makes use of a substantial number of parts of the shutter mechanism itself and the normal operation thereof, results in an arrangement which is compact and relatively inexpensive to add to the shutter mechanism normally required. It provides a power driven synchronizer mechanism which is independent of the speed at which the operator actuates the shutter release, and results in a synchronizer which is set simultaneously and automatically when the shutter is set.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim is new and desire to secure by Letters Patent of the United States is:

1. The combination with a shutter of the set type having a spring-operated blade controlling member for opening and closing the shutter blades; means for latching said blade controlling member in a cocked position; means for releasing said latching means including a power-operated release member movable from a normal latching position to release said shutter; a return spring normally moving said release member to its normal latching position; a driving spring acting on said release member in opposition to said return spring to move it from its latching position and movable between a tensioned condition, in which it is stronger than, and overcomes, said return spring, and a relieved condition, wherein it is weaker than, and is overcome, by said return spring; means for alternately tensioning said driving spring and relieving the tension therein, and including a driving connection between one end of the spring and the blade controlling member causing the spring to be tensioned when the shutter is cocked and relieving the tension in the spring when the shutter is operated; manually releasable means for maintaining said release member in its normal latching position during tensioning of said driving spring; of a flashlight synchronizing device comprising a circuit including a pair of switch contacts, the first of which is movable into engagement with the second to close the circuit and is normally spaced therefrom to open the circuit; means operatively connecting said first contact with said release member whereby it is moved into engagement with said second contact to close said circuit during movement of the release member toward its shutter releasing position and is allowed to move to its normal switch-open position when the release member returns to its latching position.

2. The combination as set forth in claim 1, and in which the first switch contact is a member carried by said release member to operatively connect the two.

3. The combination as set forth in claim 1 and in which the first switch contact is a member fixed to said release member and is engaged by the driving spring to transmit the power of said driving spring to said release member.

4. The combination as set forth in claim 1, in which the driving connection between the driving spring and the blade controlling member includes a pivoted lever for tensioning said spring and having a portion extending into the path of a projection on said blade controller ring, whereby said lever is pivoted in a direction to tension said spring as the blade controller ring is moved to a cocked position in setting the shutter.

5. The combination with a shutter of the set type having a power-operated blade controller ring moving in one direction for opening and closing the shutter blades, means for setting said blade ring and latching it in a cocked position, means for releasing said latching means and including a power-operated release member movable from a latching position to which it is normally moved by a spring when the shutter is not cocked; of a flashlight synchronizing device comprising a circuit including a first pair of normally-open switch contacts one of which is operatively connected to said release member to be moved into engagement with the other by said release member in moving to a shutter releasing position and at a predetermined time prior to release of the shutter for synchronizing flash lamps having a time lag characteristic, and a second pair of switch contacts connected in said circuit in parallel relation with said first switch contacts, one of said last pair of contacts being stationary and the other being carried by the blade controller ring to engage the same with a wiping action at the instant the shutter blades are full open for synchronizing flash lamps having no time lag characteristic, and a common means for selectively moving one of the contacts of either pair of switches out of the path of movement of the other to render the circuit controllable in accordance with the time lag characteristic of different types of flashlights to synchronize the operation of the shutter therewith.

6. The combination according to claim 5 and in which said common means is also capable of moving one switch contact of each pair out of the range of movement of the other contact of the pair, whereby the circuit will not be closed by either switch and the shutter can be used for normal daylight use with a flash lamp connected into the circuit.

7. The combination according to claim 5 in which said common means comprises an adjusting ring oscillatably mounted in the shutter casing, a cam surface on said ring for adjusting one switch contact of each pair of contacts out of the range of movement of the other contact of each pair.

8. The combination according to claim 5 in which said common means comprises an oscillatably mounted adjusting ring, and in which all of said parts including said last-mentioned adjusting ring are mounted in a shutter casing provided with a cover, said cover provided with an arcuate slot, a scale on said cover adjacent said slot indicating positions which said adjusting ring should assume for the synchronization of different types of flash lamps and for cutting out both switches, and an adjusting member fixed to said adjusting ring and extending through said slot to cooperate with said scale.

9. The combination with a shutter of the set type having a power-operated blade controller ring movable in one direction for opening and closing the shutter blades, means for setting said blade ring and latching it in a cocked position, means for releasing said latching means, of a flashlight synchronizing device comprising a circuit including a pair of switch contacts, one of said contacts carried by said blade controller ring, the other of said contacts being stationary and flexible and disposed in the path of movement of said first contact to be engaged thereby with a wiping action at the instant the shutter blades are fully open, and means operatively connected with said latching means for normally holding said second contact out of the path of movement of said first contact so that the switch will not be closed during the setting operation of the shutter.

10. The combination according to claim 9 in which said last-mentioned means includes an insulated member carried by the latching means for said blade ring and adapted to engage and hold said flexible contact out of the path of movement of said first contact when in its normal latching position.

11. The combination according to claim 9 in which the latching means for the blade ring comprises a latch member carried by said ring and a spring-operated latch on a stationary part of the shutter mechanism adapted to engage said latch member to hold the blade ring in a cocked position, and said movable switch contact is said latch member.

CARL C. FUERST.

REFERENCES CITED

The following references are of record in the file of this patent:

UNITED STATES PATENTS

| Number | Name | Date |
|---|---|---|
| 2,256,354 | Riddell | Sept. 16, 1941 |
| 2,319,086 | Riddell | May 11, 1943 |
| 2,358,941 | Schwarz | Sept. 26, 1944 |
| 2,404,526 | Pirwitz | July 23, 1946 |
| 2,405,741 | Fuerst | Aug. 13, 1946 |